J. A. EPPERSON.
HAY RAKE.
APPLICATION FILED MAY 24, 1915.

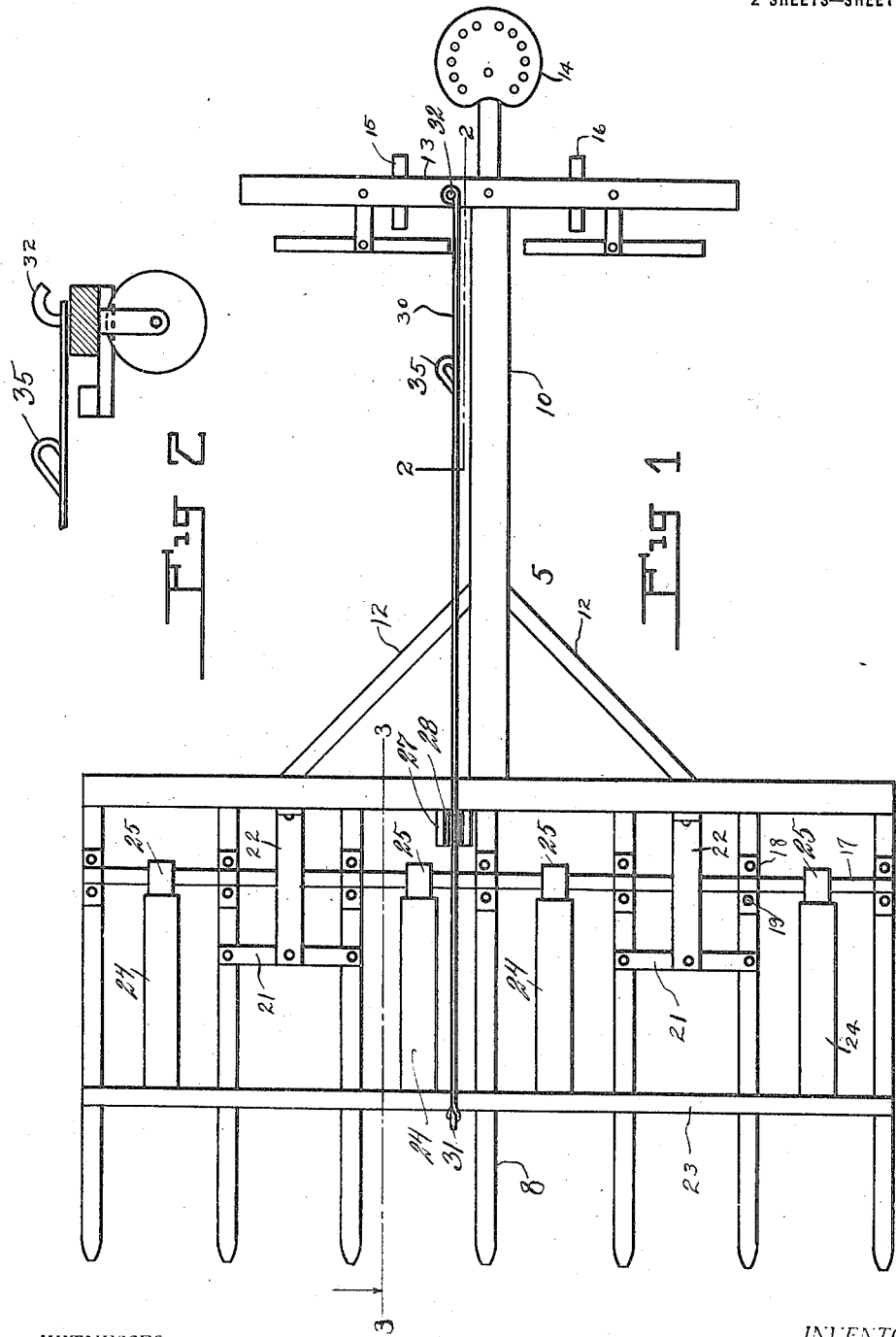

1,255,520.

Patented Feb. 5, 1918.
2 SHEETS—SHEET 2.

WITNESSES:
Chester P. Dennhardt
L. E. Henry

INVENTOR.
James A. Epperson
BY
Jno. G. Powell
ATTORNEY

UNITED STATES PATENT OFFICE.

JAMES A. EPPERSON, OF LA VETA, COLORADO.

HAY-RAKE.

1,255,520. Specification of Letters Patent. Patented Feb. 5, 1918.

Application filed May 24, 1915. Serial No. 30,072.

*To all whom it may concern:*

Be it known that I, JAMES A. EPPERSON, a citizen of the United States, residing at La Veta, in the county of Huerfano, in the State of Colorado, have invented certain new and useful Improvements in Hay-Rakes; and I do declare the following to be a full, clear, and exact description of my invention, such as will enable others skilled in the art to which it appertains to make and use the same, reference being had to the accompanying drawings and to the figures of reference marked thereon, which form a part of this specification.

My invention relates to improvements in what is commonly known as push rakes of the class employed for depositing hay on the stacker; and the invention has for its object the provision of means for depositing the hay well on the stacker, obviating the necessity of manually placing same on the stacker, which has heretofore been necessary when using rakes of this class. In other words, the hay is not entirely placed on the fingers of the stacker by the rakes commonly in use, and to firmly place the same on the stacker, it has heretofore been necessary to manually push the same well on the stacker, but by my invention, it is deposited on the fingers and also pushed well on the fingers of the stacker so that the hay may be hoisted to the stack without wasting or falling from the stacker.

In the following description of my invention, with reference to the accompanying drawings, other objects will become apparent.

Figure 3:
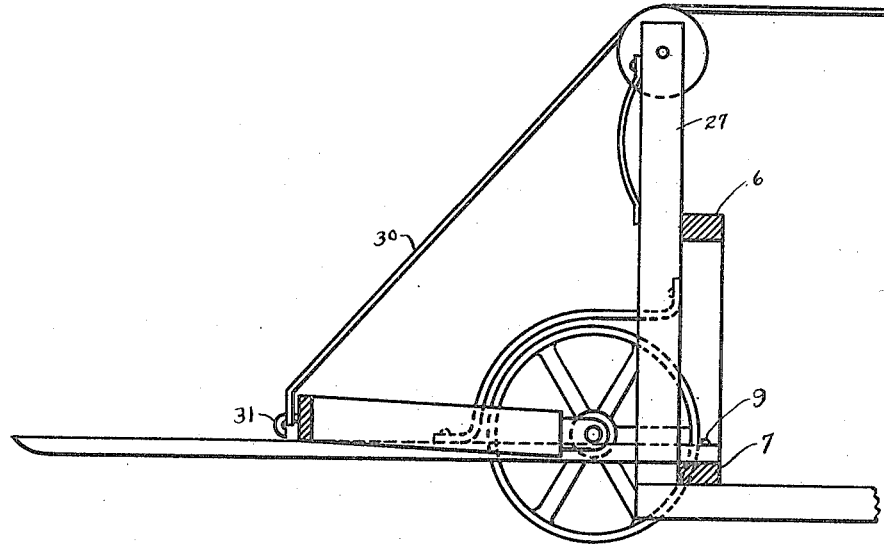
Figure 5:
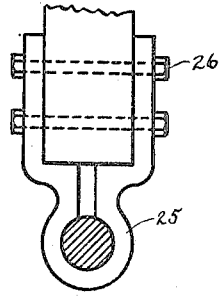
Figure 4:
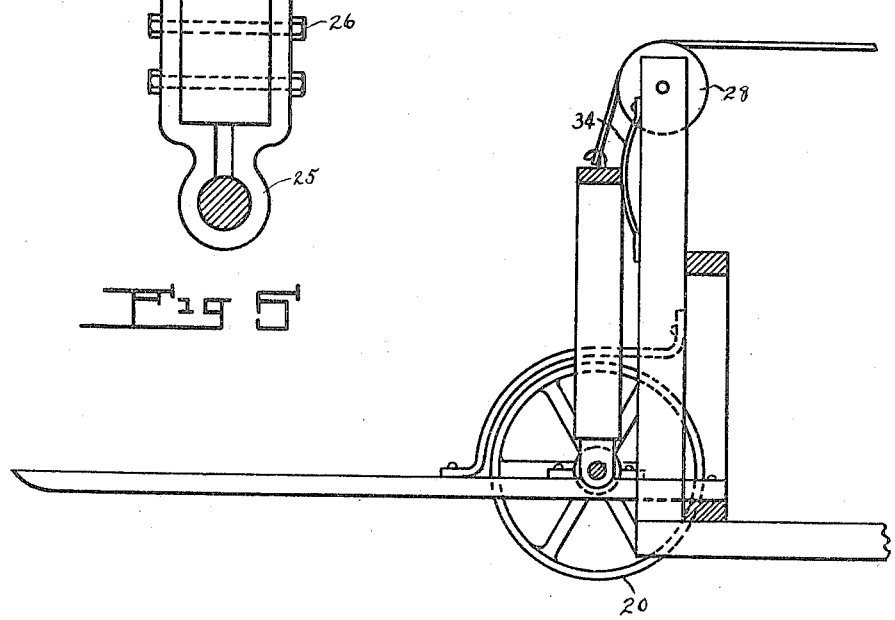

In these drawings, Figure 1 is a plan view of a push rake with my improvement attached; Fig. 2 is a cross sectional view taken on the line 2—2, Fig. 1; Fig. 3 is a cross sectional view taken on line 3—3, Fig. 1, looking in the direction of the arrow; Fig. 4 is a sectional view, taken on the line 3—3 Fig. 1, looking in the direction of the arrow, and showing the pusher member in its inoperative or raised position; and Fig. 5 is an enlarged detail view, showing the manner of hinging the pusher member to the axle of the rake.

Corresponding and like parts are referred to in the following description and indicated in all the views of the accompanying drawings by the same reference characters.

Let the numeral 5 designate what is commonly termed a push rake, the same consisting of a vertically disposed frame 6, to the lower member 7 of which is secured a plurality of parallel arranged fingers 8, as shown at 9. These fingers are approximately horizontally disposed and are adapted to pass under the hay and gather the latter thereon, there being provided in rakes of this class means for tilting the said fingers at an angle to the horizontal for purposes of adjustment. A tongue 10 is connected with the lower member of the frame 6 and extends rearwardly, the said tongue being braced to the said frame by means of brace members 12, disposed on opposite sides of the said tongue and connecting the latter with the head of the rake. A whiffle-tree mechanism 13 is connected with the rear extremity of the said tongue, and a seat 14 for the driver is also connected with and supported by the rear extremity of said tongue 10. Ground wheels 15 and 16 are carried by the whiffle-tree mechanism and support the latter, together with the rear extremity of the tongue 10.

A cylindrical axle 17 is journaled transversely of the fingers 8, saddle irons 18 being mounted over said axle and secured to the fingers 8, as shown at 19, whereby the said saddle irons form the journals for the axle. Ground wheels 20 are mounted upon the axle 17, the said wheels being interposed between adjacent fingers 8, which adjacent fingers are connected with each other by means of transverse members 21. Guard members 22 are curved over the ground wheels 20, shielding the latter from coming into contact with the hay.

Now, referring to that part of the rake which constitutes my invention, the numeral 23 represents a transverse pusher bar, which extends at right angles to the teeth, or fingers 8 of the rake, the entire width of the latter. This pusher bar 23 is provided with arms 24, suitably spaced apart and extending at right angles to the pusher bar 23. The extremities of the said arms 24, remote from the pusher bar 23, are pivoted to the axle 17 by means of clevises 25, which surround the axle 17, the said clevises being connected with the arms 24 by means of bolts 26. A post 27 is centrally positioned adjacent the frame 6, the said post being secured to the latter, and a roller 28 is journaled on said post at the upper extremity of the latter. A cable 30 is connected at one extremity with a hook 31, which hook is set in the pusher bar 23, and said cable passes over the roller 28, its opposite extremity being connected with the whiffle-tree mechanism 13 as is shown at 32, in convenient reach of the driver, or operator of the rake. Now, by drawing in this cable 30, the pusher bar will be raised to the position indicated in Fig. 4, which is the inoperative position of the pusher bar, and the position occupied by said pusher bar while the hay is being gathered on the rake, the cable 30 having a loop 35 thereon, which loop may be hooked over the hook 32, thereby maintaining the pusher bar in its inoperative position. When a sufficient quantity of hay has been gathered on the rake, the same is carried to the stacker and deposited on the fingers of the latter, and as the rake fingers are moved from under the load of hay, such movement sometimes has a tendency to move the hay therewith, but invariably the load of hay is not deposited far enough rearwardly on the fingers of the stacker, and a large quantity hangs over the forward extremities of the stacker, whereby much of the hay will fall off the stacker in being hoisted, unless placed farther back on said fingers. By my invention, this is accomplished by dropping the pusher bar 23 to the position represented in Fig. 3, after the fingers 8 have been withdrawn from under the load of hay sufficiently for said pusher bar to clear said hay and engage on the fingers 8 in front of the load of hay. Now, by moving the rake forwardly, the pusher bar 23 will engage with the hay and move the latter rearwardly on the fingers of the stacker, thereby obviating the necessity of performing this operation manually.

By virtue of the clevis connection 25, it will be understood that the pusher bar 23 may be readily and quickly detached from the rake whenever it is desired to use the latter without the pusher bar. It will further be understood that the clevis connection, above mentioned, may be dispensed with or varied in order to suit the conditions in the various makes of machines. For instance, in some machines of this class a wood axle is employed, and in such case, it will be necessary to employ means of hinging the pusher bar to the said axle, or to other parts of the machine according to the conditions.

In order to always insure the pusher bar 23 dropping to its operative position, when released, I employ a spring 34, one extremity of which is secured to the post 27, while its other extremity is free.

While I have described and illustrated herein a specific form of my invention, it is understood that I am not limited thereto and that the same may be modified and varied without departing from the spirit of the invention or the scope of the appended claims.

Having thus described my invention, what I claim and desire to secure by Letters Patent is:

1. In combination with a hay rake, of means carried by said rake and operable for fully delivering the hay to a stacker, said means consisting of a transverse bar extending the width of the rake at right angles to the teeth of the latter, arms connected with said transverse bar, said arms being pivotally connected with the axle of said rake, a vertically disposed post positioned in the rear of said bar against which said bar is adapted to rest when in the inoperative position, and a flexible member connected with said bar and extending over said post for raising said bar to its inoperative position.

2. In combination with a hay rake, of means carried by said rake and operable for fully delivering the hay to a stacker, said means consisting of a transverse bar extending at right angles to the teeth of the rake, arms connected with said transverse bar, said arms being pivotally connected with said rake, means for raising and retaining said arms in vertical position, and a spring carried by the rake, said spring being engaged and held under tension by said transverse bar when the said arms are in vertical position, said spring adapted to initially actuate said arms to horizontal position when the latter are released for disposing the said transverse bar in its operative position.

In testimony whereof, I affix my signature in the presence of two witnesses.

JAMES A. EPPERSON.

Witnesses:
D. E. DRURY,
JOHN G. POWELL.

Copies of this patent may be obtained for five cents each, by addressing the "Commissioner of Patents, Washington, D. C."